(12) United States Patent
White

(10) Patent No.: US 10,394,814 B2
(45) Date of Patent: Aug. 27, 2019

(54) STORING NESTED COMPLEX DATA STRUCTURES IN A DATA STORE

(71) Applicant: PALANTIR TECHNOLOGIES INC., Palo Alto, CA (US)

(72) Inventor: Nicholas White, London (GB)

(73) Assignee: Palantir Technologies Inc., Palo Alto, CA (US)

(*) Notice: Subject to any disclaimer, the term of this patent is extended or adjusted under 35 U.S.C. 154(b) by 77 days.

(21) Appl. No.: 15/632,105

(22) Filed: Jun. 23, 2017

(65) Prior Publication Data
US 2018/0260440 A1  Sep. 13, 2018

Related U.S. Application Data

(60) Provisional application No. 62/468,859, filed on Mar. 8, 2017.

(51) Int. Cl.
*G06F 17/30* (2006.01)
*G06F 16/2453* (2019.01)
(Continued)

(52) U.S. Cl.
CPC ........ *G06F 16/24542* (2019.01); *G06F 16/13* (2019.01); *G06F 16/221* (2019.01); *G06F 16/2282* (2019.01); *G06F 16/248* (2019.01)

(58) Field of Classification Search
USPC ................................. 707/718, 791
See application file for complete search history.

(56) References Cited

U.S. PATENT DOCUMENTS

| | | | | |
|---|---|---|---|---|
| 2009/0190760 A1* | 7/2009 | Bojinov | ............... | G06F 3/0608 380/269 |
| 2012/0078968 A1* | 3/2012 | Nixon | ................ | G06F 16/14 707/792 |

OTHER PUBLICATIONS

Official Communication for European Patent Application No. 18153772.1 dated May 25, 2018.
(Continued)

*Primary Examiner* — Hung T Vy
(74) *Attorney, Agent, or Firm* — Hickman Palermo Becker Bingham LLP

(57) ABSTRACT

A data processing method provides an improvement in speed of obtaining, in response to a computer search query from one or more computing devices, a particular compressed data chunk that may include a particular data value that is digitally stored in a large data file. The method comprises creating and digitally storing a digital data file comprising a first set of uncompressed metadata chunks; a second set of uncompressed metadata chunks; and a set of compressed data chunks; each chunk of the first and second sets of uncompressed metadata chunks comprising a set of bits; the set of compressed data chunks comprising a first compressed data chunk; the first compressed data chunk comprising a first set of values; the first set of uncompressed metadata chunks spaced evenly across the data file; the second set of uncompressed metadata chunks spaced evenly between a first metadata chunk of the first set of uncompressed metadata chunks and a second metadata chunk of the first set of uncompressed metadata chunks; the first metadata chunk comprising a first set of bits. The method further comprises setting a first subset of bits of the first set of bits to indicate a minimum value of the first set of values, setting a second subset of bits of the first set of bits to indicate a maximum value of the first set of values, and setting a third subset of bits of the first set of bits to indicate a first portion of the data file separating the first metadata chunk and the second metadata chunk. The method also comprises receiving the search query specifying the particular data value, reading the first metadata chunk, and, in response to determining that the particular data value is equal to or greater than the minimum value and equal to or less than the maximum value, sending the first compressed data chunk to the one or more computing devices.

20 Claims, 4 Drawing Sheets

(51) Int. Cl.
*G06F 16/248* (2019.01)
*G06F 16/22* (2019.01)
*G06F 16/13* (2019.01)

(56) References Cited

OTHER PUBLICATIONS

Yin Huai et al: "Major technical advancements in apache hive", Jan. 1, 2014 Proceedings of the 2014 ACM Sigmod International Conference on Management of Data, Sigmod '14, pp. 1235-1246.
Abadi et al., "The Design and Implementation of Modern Column-Oriented Database System," 2013.

* cited by examiner

US 10,394,814 B2

STORING NESTED COMPLEX DATA STRUCTURES IN A DATA STORE

BENEFIT CLAIM

This application claims the benefit under 35 U.S.C. 119(e) of provisional application 62/468,859, filed Mar. 8, 2017, the entire contents of which are hereby incorporated by reference for all purposes as if fully set forth herein.

TECHNICAL FIELD

The technical field of the present disclosure relates to digital data storage and computer programs that manage efficient digital data storage. Other technical fields include programmed data structures used for representing digital data in a data store and storing metadata that facilitates locating, retrieving and managing digital data stored in compressed data files.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many computing platforms are used for requesting, receiving, and processing electronically stored digital data in data storage, including data in a compressed or encoded form. Data can be stored in any of a variety of storage formats that define how data is encoded, and in some cases compressed, and stored in a file. In order for stored data to be searched and accessed by a computing platform, the data is first decoded and decompressed into a format readable by the computing platform.

The time and resources necessary for decoding and decompressing data can be extensive for computing systems, particularly for searches through large sets of data. Therefore, it is desirable to reduce the amount of decoding and decompressing required for accessing desired stored data using techniques that can speed up locating, accessing and retrieving data.

BRIEF DESCRIPTION OF THE DRAWINGS

The example embodiments of the present invention are illustrated, by way of example and not limitation, in the accompanying drawings and in which like reference numerals refer to similar elements and in which.

DESCRIPTION OF THE EXAMPLE EMBODIMENTS

Figure 1:
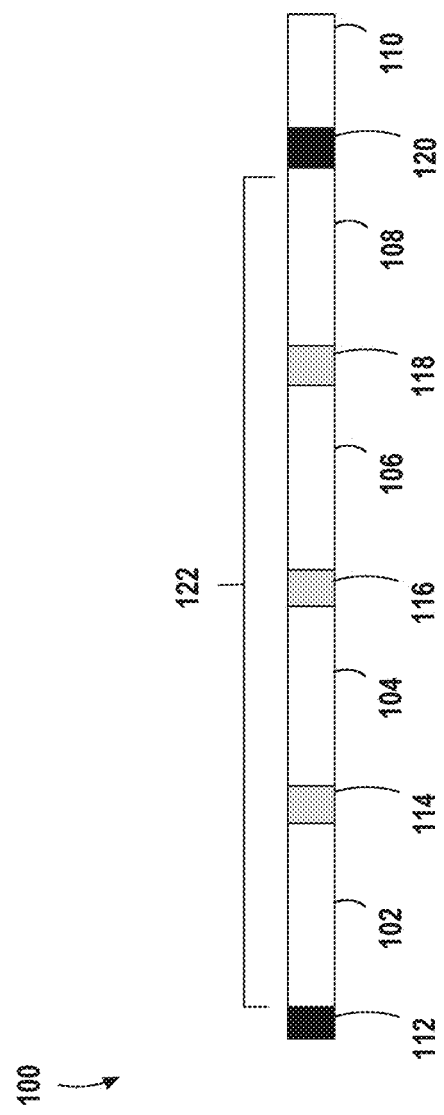
FIG. 1 illustrates a data file comprising metadata chunks and compressed data chunks.

In the following description, for the purposes of explanation, numerous specific details are set forth in order to provide a thorough understanding of example embodiments. It will be apparent, however, that the example embodiments may be practiced without these specific details. In other instances, well-known structures and devices are shown in block diagram form in order to avoid unnecessarily obscuring the example embodiments. Modifiers such as "first" and "second" may be used to differentiate elements, but the modifiers do not necessarily indicate any particular order.

General Overview

Computer-implemented techniques are provided for efficient retrieval of electronic digitally stored data using nested data structures in data storage. In an embodiment, uncompressed metadata chunks may be embedded in a data file that also includes compressed data. Each of the uncompressed metadata chunks applies or relates to a particular portion of the compressed data, and provides features of the particular portion. For example, an uncompressed metadata chunk may indicate the highest and lowest substantive data values that are stored in a portion of compressed data.

Therefore, a program implementing a search for a particular value can skip over portions of the data file having ranges that do not include the particular value. The uncompressed metadata can be searched more quickly than compressed data and does not require decompression. Consequently, searching time is reduced and decompression resources may be reserved for performing other tasks. As such, computing platforms are able to more effectively integrate with various data storage formats, using fewer CPU cycles, fewer buffer memory resources, and less use of network bandwidth for communication of result sets.

In an embodiment, a data processing method is disclosed and provides an improvement in the speed of obtaining, in response to a computer search query from one or more computing devices, a particular compressed data chunk that may include a particular data value. Data, in embodiments, is digitally stored typically in a data file and embodiments may be particularly effective in data files hosting millions of rows of data, although a particular size of data file, storage device or table is not required.

In an embodiment, the method comprises creating and digitally storing a digital data file comprising a first set of uncompressed metadata chunks, a second set of uncompressed metadata chunks, and a set of compressed data chunks, each chunk of the first and second sets of uncompressed metadata chunks comprising a set of bits. The set of compressed data chunks comprises a first compressed data chunk; the first compressed data chunk comprises a first set of values; the first set of uncompressed metadata chunks is spaced evenly across the data file; the second set of uncompressed metadata chunks spaced evenly between a first metadata chunk of the first set of uncompressed metadata chunks and a second metadata chunk of the first set of uncompressed metadata chunks; and the first metadata chunk comprises a first set of bits.

The method further comprises setting a first subset of bits of the first set of bits to indicate a minimum value of the first set of values, setting a second subset of bits of the first set of bits to indicate a maximum value of the first set of values, and setting a third subset of bits of the first set of bits to indicate a first portion of the data file separating the first metadata chunk and the second metadata chunk. The method further comprises receiving the search query specifying the particular data value; reading the first metadata chunk; and in response to determining that the particular data value is equal to or greater than the minimum value and equal to or less than the maximum value, sending the first compressed data chunk to the one or more computing devices.

Other embodiments, aspects of embodiments and features of embodiments will become apparent from the disclosure as a whole.

Example Data Files

FIG. 1 illustrates an example data file that may be used in an embodiment, comprising metadata chunks and compressed data chunks.

The data file of FIG. 1 is one example representation and other layouts of metadata and compressed or encoded data are considered. Data used in embodiments may be digitally stored in a variety of formats, including tables, rows, columns, and strings, and in relational databases, object data stores, associative data stores, and other repositories. Embodiments are not limited to any particular table structure or database structure.

In one embodiment, the data of FIG. 1 is stored in a columnar storage format that supports nested data and the use of encoded metadata. For example, the data of FIG. 1 may be implemented in the context of a columnar data store that supports complex nested data structures, record shredding and assembly, support for efficient compression and encoding processes, specifying compression on a per-column basis, and other foundation services. Rows of records in the columnar data store may be organized in one or more row groups, where a row group contains one column chunk per column, and column chunks contain one or more pages. A column chunk is a chunk of the data for a particular column, stored contiguously in the file. Pages are indivisible units for purposes of compression and encoding; there may be multiple page types that are interleaved in a column chunk. Each file contains the metadata for the file, but does not need to actually contain the data. In an embodiment, metadata comprises file metadata, column (chunk) metadata and page header metadata. File metadata contains locations of all column metadata start locations, as further described. For example, embodiments may implement the PARQUET storage format that is described in the document "parquet-format.git" that is available at the time of this writing at git.apache.org via the GIT system.

In an embodiment, a data file 100 comprises compressed a plurality of data subsets 102, 104, 106, 108 that are interspersed with metadata chunks 112, 114, 116, 118, 120. The compressed data subsets 102, 104, 106, 108 form parts of a first compressed data set 122. A first metadata chunk 112 and a second metadata chunk 120 comprise a first level of metadata chunks and other metadata chunks 114, 116, 118 comprise a second level of metadata chunks. "Chunk," in this context, may refer to a portion of metadata.

The uncompressed metadata chunks digitally store information about the compressed data. Each metadata chunk may be associated with one or more portions of the compressed data. For example, the first metadata chunk 112 may be associated with the first set of compressed data 122. That is, the first metadata chunk 112 may comprise a set of bits that is used to convey information about the first set of compressed data 122. The information may indicate what values, how many values, or what types of values are stored in the first set of compressed data 122. For example, a first set of bits of the first metadata chunk may indicate a minimum value that is stored in the first set of compressed data 122, and a second set of bits may indicate a maximum value stored in the first set of compressed data 122.

Other embodiments may represent data, signals or hints other than minimum and maximum values.

In an embodiment, the data file is sorted by the primary key, and a list of locations of metadata is maintained at the end of the datafile. With this arrangement, efficient binary searches can be performed across the data. In support of performing such searches, another set of bits in the first metadata chunk 112 may indicate a portion of the data file that separates the first metadata chunk 112 from the second metadata chunk 120. That is, the set of bits indicates how much of the data file a program should skip to read the second metadata chunk 120. A program that is coded to read such a set of bits in the first metadata chunk 112, then skip to read the second metadata chunk 120, can quickly search a large data file by reading the metadata to find sets of compressed data with suitable ranges. If a particular set of compressed data does not have a suitable range, it can be skipped.

Since reading compressed data may require extensive time and resources, skipping compressed data that outside the scope of a query, cannot be used in a result set that matches the requirements of a query, is not within the scope of a search, does not match search terms, or otherwise is not needed, greatly improves efficiency in terms of CPU cycles, network bandwidth, use of buffer memory or other transient storage, and other computing resources.

In an embodiment, a data file may include multiple levels of compressed data, and the first set of compressed data 122 is part of a first level. Other sets of compressed data 102, 104, 106, 108 may comprise a second level of compressed data. Each of the other sets of compressed data 102, 104, 106, 108 also may have an associated metadata chunk 114, 116, 118 in the data file. A first subset of compressed data 102 may be associated with a unique metadata chunk or may be associated with the first metadata chunk 112. For example, the first metadata chunk 112 may also have bits that indicate values in the first subset of compressed data 102, and bits or a value that indicate how many bits a program should skip to reach a first metadata chunk 114 in the second level.

Second level metadata chunks 114, 116, 118 also may comprise sets of bits indicating information about the associated set of compressed data. Example information that can be used in various embodiments includes number of values, minimum value or maximum value. Second level metadata chunks 114, 116, 118 also may comprise sets of bits indicating a portion of the data file to skip to reach the next metadata chunk. In an embodiment, because second level metadata chunks maintain only the location of the next second-level chunk, finding the locations of the second-level chunks may be facilitated by performing a linear scan over the second level metadata, after a binary search of the top-level metadata. The linear scan may be constrained to areas of the file that are indicated by the top-level metadata. If the second-level metadata indicates a useful value is in the block it governs, then the data is decompressed and read. Furthermore, because the data is sorted as previously noted, the sequential scan of the second-level metadata may be programmed to stop when all blocks of compressed data that contain useful data have been passed. The stopping point may be identified by determining that the minimum value of the current second-level metadata is greater than the highest value sought in the search.

These values in the metadata chunks may provide additional improvements in computer efficiency. For example, if a program interoperating with the metadata determines that the first set of compressed data 122 has a suitable range of values, then the program can read the first set of compressed data, but the program also can skip portions of the first set of compressed data that have unsuitable ranges based on metadata chunks associated with smaller sets within the first set.

A first level of metadata chunks and a second level of metadata chunks are shown merely to illustrate one clear example. Additional levels within the second level can also be included in the data file.

In this context, a "suitable range" may be any range of data values that possibly include a desired value. For example, a program may form a search query that is matched by data having a value of "10". The program may perform a search of the data file 100 to locate the value "10". Rather than reading every set of compressed data, which requires extensive time and resources, the program first reads sets of uncompressed metadata in the data file, which requires less time and resources. The first chunk of metadata 112 in the data file has bits set to indicate a minimum value and maximum value of a first set of the compressed data 122 in the data file 100. If, for example, the first chunk of metadata 112 indicates a minimum value of "5" and a maximum value of "60", the first chunk of metadata 112 has a "suitable range" for the search query because "10" is between "5" and "60". That is, the first set of the compressed data 122 associated with the first chunk of metadata 112 could include the value "10". In this case, the program either could read the entire first set of compressed data 122 to search for the value "10", or the program could read second level metadata chunks 114, 116, 118 that are associated with subsets of compressed data 102, 104, 106, 108 within the first set 122.

These second level metadata chunks also indicate minimum and maximum values such that the program can determine if each subset has a suitable range. Second level metadata chunks 114, 116, 118 may be spaced evenly between two first level metadata chunks 112, 120.

However, if the first chunk of metadata 112 indicates, for example, a minimum value of "40" and a maximum value of "80", then the program determines that the first portion of compressed data 122 does not have a suitable range. In this case, the program can skip the first portion of compressed data 122 to save CPU cycles, use of buffer memory or other resources, and program execution time. The skipping is facilitated by additional information in the first metadata chunk 112 that indicates the size of the first portion or a portion of the data file that separates the first metadata chunk 112 from the second metadata chunk 120 on the first level.

Sets of compressed data within a level may have similar sizes. In one example, sets in the first level may include approximately one megabyte (MB) of data and sets in the second level may include approximately 4 KB (kilobytes) of data. In an embodiment, size of data sets may be measured as a number of rows or columns.

The size of data sets may affect how quickly searches may be performed. For example, if the size of a compressed data set associated with one chunk of metadata is too large, a program may be required to decode and decompress more data than is necessary because the range specified in the chunk of metadata becomes larger with increasing size of the set of compressed data. Likewise, if the size of the compressed data set associated with one chunk of metadata is too small, more time is spent searching through metadata because more chunks of metadata are required and the file size becomes bigger as more metadata must be stored in it.

Data may be stored using an incrementally-computed pipeline that allows for efficiently maintaining updates and changing as little as possible. Stored data may be frequently updated in some cases as new data is received. In an embodiment, received data may be sorted using values within the data as boundaries between groups of data, which facilitates notably efficient processing. Each group of data may be processed by a different program or computer within a computer system to improve efficiency of the system. Assume for example that a current version of data is divided into N chunks based upon values in the data, and a new dataset needs to be incorporated. In an embodiment, the system is programmed to assign each of the N chunks to a different machine, to divide processing load. The new data is divided along the same N values as the original data was divided, each chunk is sorted. Each of the N chunks of new data is sent to the machine that is responsible for the corresponding (nth) chunk of the original data. Each of the N machines merges its sorted original chunk with the sorted new chunk, leaving a shorted chunk as the result. This is an O(n) or linear-time operation.

The groups may be equally sized such that each computer or program within the system performs an approximately equal amount of work. As updated data is received, it is paired with groups of stored data. By maintaining sorted groups of data, a program or computer can more search through the data more efficiently and with less use of resources by determining if each group has a suitable range of values.

In an embodiment, a program requesting data does not need to perform any indexing or organizing tasks. These functions are not necessary in the program because the stored data is sorted and embedded with metadata that provides a quasi-index of the values contained in the stored data.

Example Process Overview

Figure 2:
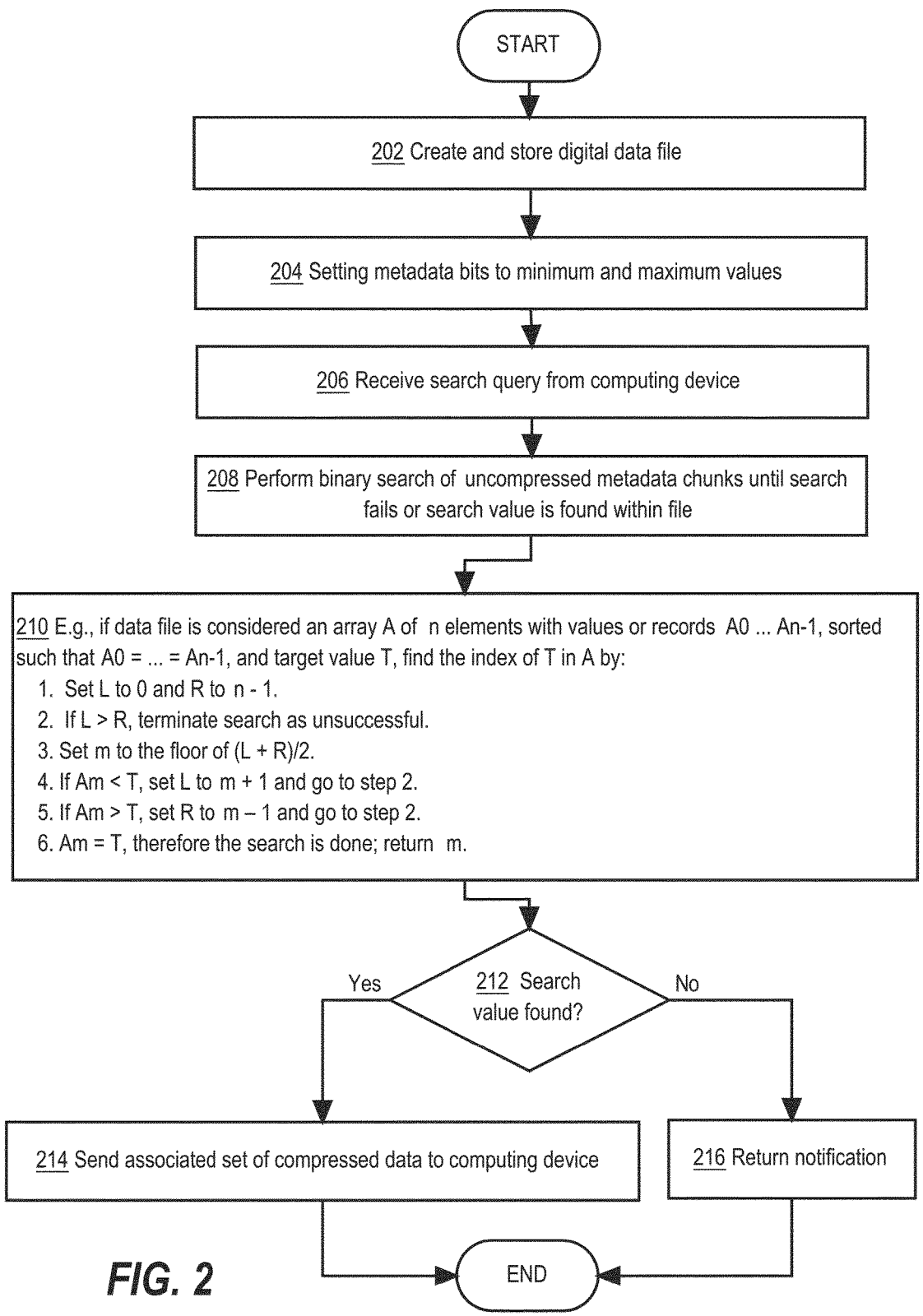
FIG. 2 illustrates a process or algorithm for obtaining data values from stored data.

FIG. 2 illustrates an algorithm for an approach for obtaining data values from stored data. Although the steps in FIG. 2 are shown in an order, the steps of FIG. 2 may be performed in a different order in some embodiments, and are not limited to the order shown in FIG. 2. Additionally, some steps may be optional, may be performed multiple times, and/or may be performed by different components. All steps, operations and functions of FIG. 2 and any other a flow diagram described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, the flow diagram in this disclosure is a guide, plan or specification of an algorithm for programming a computer to execute the functions that are described.

At block 202, a process involves creating and digitally storing a digital data file. The data file may comprise multiple sets of uncompressed metadata chunks which may be grouped into multiple levels. Metadata chunks in the first level may be evenly spaced across the data file while metadata chunks in the second level may be evenly spaced between two first level metadata chunks. The data file may also comprise multiple sets of compressed data chunks. The locations of the first level metadata chunks within the file may be appended as a list to the file.

At block 204, the process involves setting bits of a first metadata chunk to indicate a minimum value and maximum value stored in a first compressed data chunk. The process 200 may also involve setting bits of the first metadata chunk to indicate a portion of the data file separating the first metadata chunk from another metadata chunk in the data file.

At block 206, the process involves receiving a search query specifying a particular data value from one or more computing devices. The search query may be any suitable request for retrieving the particular value from data storage.

At block 208, the process performs a binary search of the first uncompressed metadata chunks until the search either fails to locate the particular data value or the particular data value is found in the file.

For example, as shown at block 210, the process operates according to a binary search algorithm in which for purposes of clear explication the data file may be considered as an array A of n elements with values or records $A_0$ to $A_{n-1}$, sorted such that $A_0 \leq \ldots \leq A_{n-1}$, and target value T; the index of T may be found in A via the following sub steps. First, set L to 0 and set R to n−1. Second, if L>R, then terminate the search as unsuccessful in locating the particular data value. Third, set m to the floor of (L+R)/2. Next, if $A_m$<T, that is, if the target value T is greater than the whole range of values represented in the uncompressed first metadata chunk at $A_m$, then set L to m+1 and return to the second step. Next, if $A_m$>T, that is, if the target value T is less than the range represented by the uncompressed first metadata chunk at $A_m$, then set R to m−1 and return to the second step. Otherwise $A_m$=T (that is, the target value T is within the range of the uncompressed metadata chunk under consideration) so the search is done and the uncompressed metadata chunk at m may be used to find an associated set of compressed data to return.

Using this approach the process is programmed ultimately for determining whether the particular value is within the data file. If the particular value is found in the data file, as tested at block 212, then the associated set of compressed data is sent to the computing device as next described. If the particular value is not within the range, then a notification may be returned at 216, an exception can be thrown or other responsive action can be taken.

At block 214, the process 200 involves sending a first set of compressed data associated with the first metadata chunk to the one or more computing device. The first set of compressed data is the set having the minimum and maximum values as indicated by the first metadata chunk that was found atm in block 210 for example. In an embodiment, block 214 may also involve reading the first set of compressed data. Reading may involve decoding and decompressing the compressed data.

In an alternative embodiment, if the particular value is within the range, the process may involve reading a second level metadata chunk. The second level may refer to a set of metadata chunks that are situated between the first metadata chunk and a second metadata chunk. The first and second metadata chunks may be referred to as "second level" metadata chunks. The second level metadata chunks have bits similar to metadata in the first level and are indicative of values of smaller subsets of compressed data within first set of compressed data. For any second level metadata chunks having a suitable range, the associated subset of compressed data is sent to the computing system.

With the binary search approach, the process may stop reading the data file immediately after the particular value is retrieved. Furthermore, because the data is sorted, if the desired value was not in a current block under consideration in one of the steps of block 210, and the metadata of the next block indicates that its minimum value is greater than the desired value, then the search for that value can terminate, because the desired value logically cannot be in the file. In this respect the present approach offers benefits not realized in traditional binary search algorithms that deal with underlying data that does not represent ranges of other data.

Further, with this approach, a program can read the file metadata to find all column chunks that are responsive to a query or other request that is part of the program or generated by the program, and then read the column chunks sequentially.

Implementation Example—Computing Device

Figure 3:
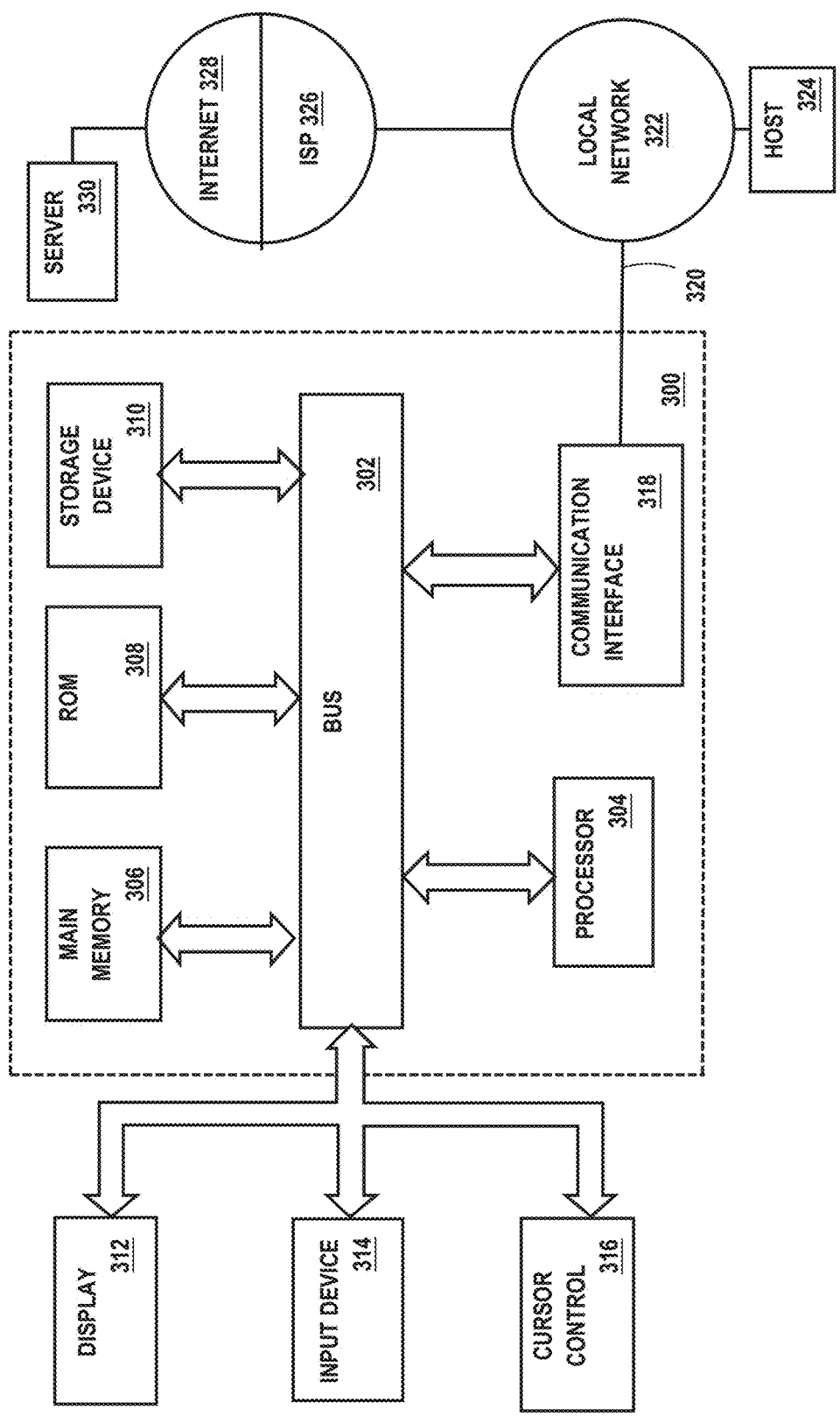
FIG. 3 illustrates an example computing device with which embodiments may be used.

Referring now to FIG. 3, it is a block diagram that illustrates a computing device 300 in which the example embodiments of the present Application may be embodied. Computing device 300 and its components, including their connections, relationships, and functions, is meant to be exemplary only, and not meant to limit implementations of the example embodiments. Other computing devices suitable for implementing the example embodiments may have different components, including components with different connections, relationships, and functions.

Computing device 300 may include a bus 302 or other communication mechanism for addressing main memory 306 and for transferring data between and among the various components of device 300.

Computing device 300 may also include one or more hardware processors 304 coupled with bus 302 for processing information. A hardware processor 304 may be a general purpose microprocessor, a system on a chip (SoC), or other processor.

Main memory 306, such as a random access memory (RAM) or other dynamic storage device, also may be coupled to bus 302 for storing information and software instructions to be executed by processor(s) 304. Main memory 306 also may be used for storing temporary variables or other intermediate information during execution of software instructions to be executed by processor(s) 304.

Software instructions, when stored in storage media accessible to processor(s) 304, render computing device 300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 300 also may include read only memory (ROM) 308 or other static storage device coupled to bus 302 for storing static information and software instructions for processor(s) 304.

One or more mass storage devices 310 may be coupled to bus 302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 310 (e.g., the main hard disk for the device) stores a body of program and data for directing operation of the computing device, including an operating system, user application programs, driver and other support files, as well as other data files of all sorts.

Computing device 300 may be coupled via bus 302 to display 312, such as a liquid crystal display (LCD) or other electronic visual display, for displaying information to a computer user. In some configurations, a touch sensitive surface incorporating touch detection technology (e.g., resistive, capacitive, etc.) may be overlaid on display 312 to form a touch sensitive display for communicating touch gesture (e.g., finger or stylus) input to processor(s) 304.

An input device 314, including alphanumeric and other keys, may be coupled to bus 302 for communicating information and command selections to processor 304. In addition to or instead of alphanumeric and other keys, input device 314 may include one or more physical buttons or switches such as, for example, a power (on/off) button, a "home" button, volume control buttons, or the like.

Another type of user input device may be a cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

While in some configurations, such as the configuration depicted in FIG. 3, one or more of display 312, input device 314, and cursor control 316 are external components (i.e., peripheral devices) of computing device 300, some or all of display 312, input device 314, and cursor control 316 are integrated as part of the form factor of computing device 300 in other configurations.

Functions of the disclosed systems, methods, and modules may be performed by computing device 300 in response to processor(s) 304 executing one or more programs of software instructions contained in main memory 306. Such software instructions may be read into main memory 306 from another storage medium, such as storage device(s) 310. Execution of the software instructions contained in main memory 306 cause processor(s) 304 to perform the functions of the example embodiments.

While functions and operations of the example embodiments may be implemented entirely with software instructions, hard-wired or programmable circuitry of computing device 300 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more software instructions to processor(s) 304 for execution. For example, the software instructions may initially be carried on a magnetic disk or solid-state drive of a remote computer. The remote computer can load the software instructions into its dynamic memory and send the software instructions over a telephone line using a modem. A modem local to computing device 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor(s) 304 retrieves and executes the software instructions. The software instructions received by main memory 306 may optionally be stored on storage device(s) 310 either before or after execution by processor(s) 304.

Computing device 300 also may include one or more communication interface(s) 318 coupled to bus 302. A communication interface 318 provides a two-way data communication coupling to a wired or wireless network link 320 that is connected to a local network 322 (e.g., Ethernet network, Wireless Local Area Network, cellular phone network, Bluetooth wireless network, or the like). Communication interface 318 sends and receives electrical, electromagnetic, or optical signals that carry digital data streams representing various types of information. For example, communication interface 318 may be a wired network interface card, a wireless network interface card with an integrated radio antenna, or a modem (e.g., ISDN, DSL, or cable modem).

Network link(s) 320 typically provide data communication through one or more networks to other data devices. For example, a network link 320 may provide a connection through a local network 322 to a host computer 324 or to data equipment operated by an Internet Service Provider (ISP) 326. ISP 326 in turn provides data communication services through the world wide packet data communication network now commonly referred to as the "Internet" 328. Local network(s) 322 and Internet 328 use electrical, electromagnetic or optical signals that carry digital data streams. The signals through the various networks and the signals on network link(s) 320 and through communication interface(s) 318, which carry the digital data to and from computing device 300, are example forms of transmission media.

Computing device 300 can send messages and receive data, including program code, through the network(s), network link(s) 320 and communication interface(s) 318. In the Internet example, a server 330 might transmit a requested code for an application program through Internet 328, ISP 326, local network(s) 322 and communication interface(s) 318.

The received code may be executed by processor 304 as it is received, and/or stored in storage device 310, or other non-volatile storage for later execution.

Implementation Example—Foundation Software System

Figure 4:
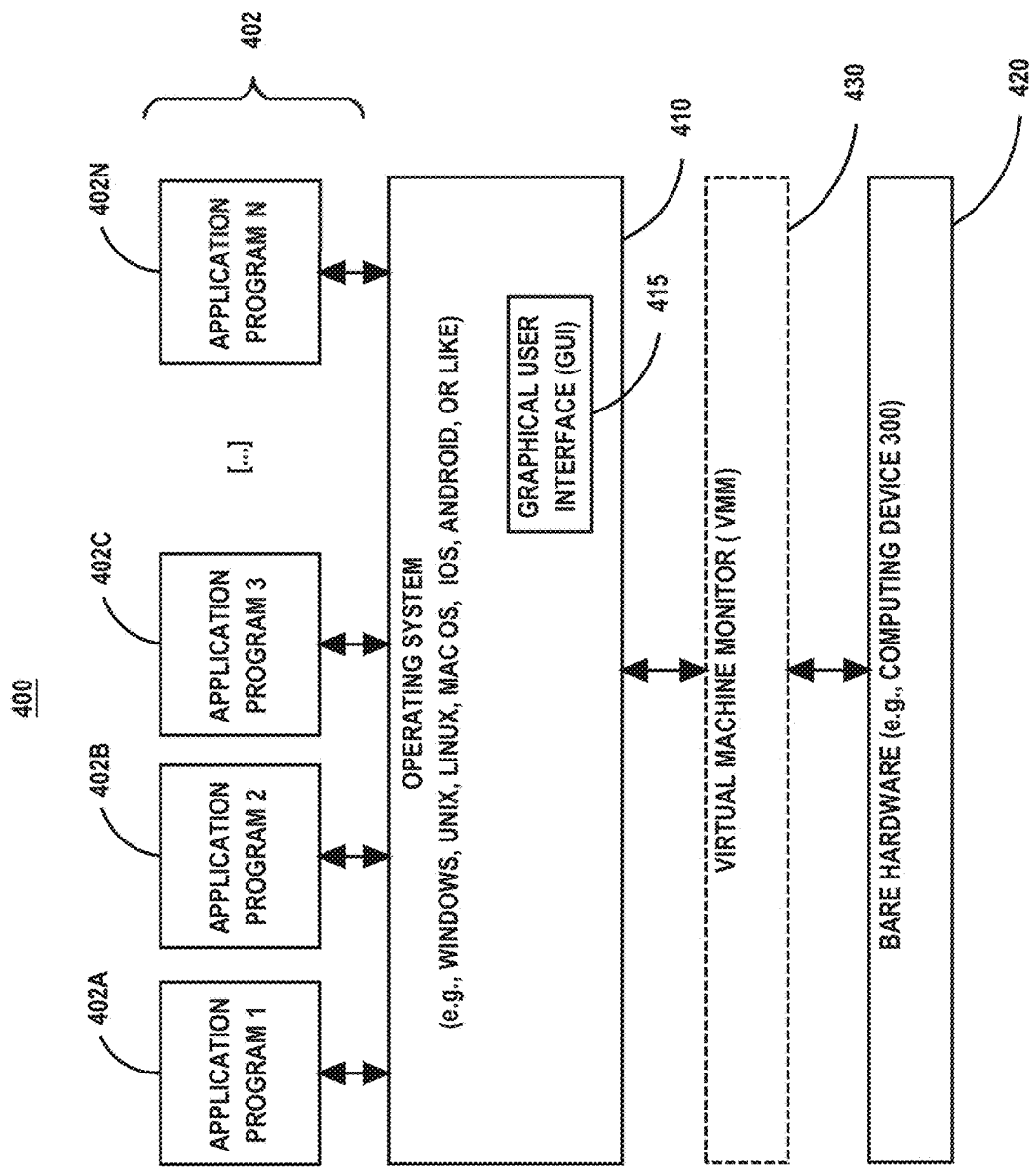
FIG. 4 illustrates an example software system for controlling the operation of the computing device of FIG. 3.

FIG. 4 is a block diagram of a software system 400 that may be employed for controlling the operation of computing device 300. Software system 400 and its components, including their connections, relationships, and functions, is meant to be exemplary only, and not meant to limit implementations of the example embodiments. Other software systems suitable for implementing the example embodiments may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMI 430 may provide para-virtualization to a guest operating system in some instances.

The above-described computer hardware and software is presented for purpose of illustrating the example underlying computer components that may be employed for implementing the example embodiments. The example embodiments, however, are not necessarily limited to any particular computing environment or computing device configuration. Instead, the example embodiments may be implemented in any type of system architecture or processing environment that one skilled in the art, in light of this disclosure, would understand as capable of supporting the features and functions of the example embodiments presented herein.

Extensions and Alternatives

In the foregoing specification, the example embodiments of the present Application have been described with reference to numerous specific details. However, the details may vary from implementation to implementation according to the requirements of the particular implement at hand. The example embodiments are, accordingly, to be regarded in an illustrative rather than a restrictive sense.

What is claimed is:

1. A data processing method providing an improvement in speed of obtaining, in response to a computer search query from one or more computing devices, a particular compressed data chunk that may include a particular data value that is digitally stored in a large data file, the method comprising the steps of:
    creating and digitally storing a digital file of sorted data comprising a first set of uncompressed metadata chunks, a second set of uncompressed metadata chunks, a set of compressed data chunks, and location metadata for the first set of metadata chunks at an end of the digital file; each chunk of the first and second sets of uncompressed metadata chunks comprising a set of bits; the set of compressed data chunks comprising a first compressed data chunk; the first compressed data chunk comprising a first set of values; the first set of uncompressed metadata chunks spaced evenly across the data file; the second set of uncompressed metadata chunks spaced evenly between a first metadata chunk of the first set of uncompressed metadata chunks and a second metadata chunk of the first set of uncompressed metadata chunks; the first metadata chunk comprising a first set of bits;
    setting a first subset of bits of the first set of bits to indicate a minimum value of the first set of values, setting a second subset of bits of the first set of bits to indicate a maximum value of the first set of values, and setting a third subset of bits of the first set of bits to indicate a first portion of the data file separating the first metadata chunk and the second metadata chunk;
    receiving the search query specifying the particular data value;
    reading the first metadata chunk; in response to determining that the particular data value is equal to or greater than the minimum value and equal to or less than the maximum value, sending the first compressed data chunk to the one or more computing devices.

2. The method of claim 1, the set of compressed data chunks comprising a second compressed data chunk, the second compressed data chunk comprising a second set of values, and the second metadata chunk comprising a second set of bits, the method further comprising:
    setting a first subset of bits of the second set of bits to indicate a minimum value of the second set of values, setting a second subset of bits of the second set of bits to indicate a maximum value of the second set of values, and setting a third subset of bits of the first set of bits to indicate a second portion of the data file separating the second metadata chunk and a third metadata chunk of the first set of metadata chunks;
    in response to determining that the particular data value is not equal to or greater than the minimum value of the first set of values or equal to or less than the maximum value of the first set of values:
    skipping the first portion of the data file;
    reading the second metadata chunk; and in response to determining that the particular data value is equal to or greater than the minimum value of the second set of values and equal to or less than the maximum value of the second set of values, sending the second compressed data chunk to the one or more computing devices.

3. The method of claim 1, wherein the second set of uncompressed metadata chunks comprises a third metadata chunk, wherein the third metadata chunk comprises a second set of bits, wherein the third metadata chunk immediately precedes a second compressed data chunk, wherein the second compressed data chunk is a subset of the first compressed data chunk, and wherein the second compressed data chunk comprises a second set of values, the method further comprising:
in response to determining that the particular data value is equal to or greater than the minimum value of the first set of values and equal to or less than the maximum value of the first set of values, reading the third metadata chunk.

4. The method of claim 3 further comprising setting a first subset of bits of the second set of bits to indicate a minimum value of the second set of values.

5. The method of claim 3 further comprising setting a second subset of bits of the second set of bits to indicate a maximum value of the second set of values.

6. The method of claim 3 further comprising setting a third subset of bits of the second set of bits to indicate a second portion of the data file separating the third metadata chunk and a fourth metadata chunk of the second set of uncompressed metadata chunks.

7. The method of claim 3 further comprising, in response to determining that the particular data value is equal to or greater than the minimum value of the second set of values and equal to or less than the maximum value of the second set of values, sending the second compressed data chunk to the one or more computing devices.

8. The method of claim 1, further comprising setting a fourth subset of bits of the first set of bits to indicate a number of values in the first set of values.

9. The method of claim 1, wherein the first metadata chunk immediately precedes the set of compressed data chunks in the data file.

10. The method of claim 1 wherein reading the first metadata chunk comprises performing a binary search of the first set of uncompressed metadata chunks and one or more linear searches of the second set of uncompressed metadata chunks.

11. A data processing system providing an improvement in speed of obtaining, in response to a computer search query from one or more computing devices, a particular compressed data chunk that may include a particular data value that is digitally stored in a large data file, comprising:
one or more processors;
one or more non-transitory computer-readable storage media storing one or more sequences of instructions which when executed by the one or more processors cause performing:
creating and digitally storing a digital file of sorted data comprising a first set of uncompressed metadata chunks, a second set of uncompressed metadata chunks, a set of compressed data chunks, and location metadata for the first set of metadata chunks at an end of the digital file; each chunk of the first and second sets of uncompressed metadata chunks comprising a set of bits; the set of compressed data chunks comprising a first compressed data chunk; the first compressed data chunk comprising a first set of values; the first set of uncompressed metadata chunks spaced evenly across the data file; the second set of uncompressed metadata chunks spaced evenly between a first metadata chunk of the first set of uncompressed metadata chunks and a second metadata chunk of the first set of uncompressed metadata chunks; the first metadata chunk comprising a first set of bits;
setting a first subset of bits of the first set of bits to indicate a minimum value of the first set of values, setting a second subset of bits of the first set of bits to indicate a maximum value of the first set of values, and setting a third subset of bits of the first set of bits to indicate a first portion of the data file separating the first metadata chunk and the second metadata chunk;
receiving the search query specifying the particular data value;
reading the first metadata chunk;
in response to determining that the particular data value is equal to or greater than the minimum value and equal to or less than the maximum value, sending the first compressed data chunk to the one or more computing devices.

12. The system of claim 11, the set of compressed data chunks comprising a second compressed data chunk, the second compressed data chunk comprising a second set of values, and the second metadata chunk comprising a second set of bits, the system further comprising sequences of instructions which when executed using the one or more processors cause:
setting a first subset of bits of the second set of bits to indicate a minimum value of the second set of values, setting a second subset of bits of the second set of bits to indicate a maximum value of the second set of values, and setting a third subset of bits of the first set of bits to indicate a second portion of the data file separating the second metadata chunk and a third metadata chunk of the first set of metadata chunks;
in response to determining that the particular data value is not equal to or greater than the minimum value of the first set of values or equal to or less than the maximum value of the first set of values:
skipping the first portion of the data file;
reading the second metadata chunk; and
in response to determining that the particular data value is equal to or greater than the minimum value of the second set of values and equal to or less than the maximum value of the second set of values, sending the second compressed data chunk to the one or more computing devices.

13. The system of claim 11, wherein the second set of uncompressed metadata chunks comprises a third metadata chunk, wherein the third metadata chunk comprises a second set of bits, wherein the third metadata chunk immediately precedes a second compressed data chunk, wherein the second compressed data chunk is a subset of the first compressed data chunk, and wherein the second compressed data chunk comprises a second set of values, the system further comprising sequences of instructions which when executed using the one or more processors cause:
in response to determining that the particular data value is equal to or greater than the minimum value of the first set of values and equal to or less than the maximum value of the first set of values, reading the third metadata chunk.

14. The system of claim 13 further comprising sequences of instructions which when executed using the one or more processors cause setting a first subset of bits of the second set of bits to indicate a minimum value of the second set of values, or setting a second subset of bits of the second set of bits to indicate a maximum value of the second set of values.

15. The system of claim 13 the system further comprising sequences of instructions which when executed using the one or more processors cause setting a third subset of bits of the second set of bits to indicate a second portion of the data file separating the third metadata chunk and a fourth metadata chunk of the second set of uncompressed metadata chunks.

16. The system of claim 13 further comprising sequences of instructions which when executed using the one or more processors cause, in response to determining that the particular data value is equal to or greater than the minimum value of the second set of values and equal to or less than the maximum value of the second set of values, sending the second compressed data chunk to the one or more computing devices.

17. The system of claim 11, the system further comprising sequences of instructions which when executed using the one or more processors cause setting a fourth subset of bits of the first set of bits to indicate a number of values in the first set of values.

18. The system of claim 11, wherein the first metadata chunk immediately precedes the set of compressed data chunks in the data file.

19. The system of claim 11, the system further comprising sequences of instructions which when executed using the one or more processors cause reading the first metadata chunk by performing a binary search of the first set of uncompressed metadata chunks and one or more linear searches of the second set of uncompressed metadata chunks.

20. One or more non-transitory computer-readable storage media storing one or more sequences of instructions which when executed by the one or more processors cause performing a method providing an improvement in speed of obtaining, in response to a computer search query from one or more computing devices, a particular compressed data chunk that may include a particular data value that is digitally stored in a large data file, the method comprising the steps of:

creating and digitally storing a digital file of sorted data comprising a first set of uncompressed metadata chunks, a second set of uncompressed metadata chunks, a set of compressed data chunks, and location metadata for the first set of metadata chunks at an end of the digital file; each chunk of the first and second sets of uncompressed metadata chunks comprising a set of bits; the set of compressed data chunks comprising a first compressed data chunk; the first compressed data chunk comprising a first set of values; the first set of uncompressed metadata chunks spaced evenly across the data file; the second set of uncompressed metadata chunks spaced evenly between a first metadata chunk of the first set of uncompressed metadata chunks and a second metadata chunk of the first set of uncompressed metadata chunks; the first metadata chunk comprising a first set of bits;

setting a first subset of bits of the first set of bits to indicate a minimum value of the first set of values, setting a second subset of bits of the first set of bits to indicate a maximum value of the first set of values, and setting a third subset of bits of the first set of bits to indicate a first portion of the data file separating the first metadata chunk and the second metadata chunk;

receiving the search query specifying the particular data value;

reading the first metadata chunk; in response to determining that the particular data value is equal to or greater than the minimum value and equal to or less than the maximum value, sending the first compressed data chunk to the one or more computing devices.

\* \* \* \* \*